United States Patent [19]

Clapperton

[11] 4,386,981
[45] Jun. 7, 1983

[54] METHOD OF WATERPROOFING ROOFS AND THE LIKE

[75] Inventor: Allan S. Clapperton, Toledo, Ohio

[73] Assignee: W. R. Grace & Co., Cambridge, Mass.

[21] Appl. No.: 268,591

[22] Filed: May 29, 1981

[51] Int. Cl.³ .................. B32B 3/00; B32B 5/16; B32B 11/00
[52] U.S. Cl. .................. 156/71; 156/249; 156/337; 428/40; 428/41; 428/143; 428/291; 428/332
[58] Field of Search .................. 428/40, 41, 192, 143, 428/291, 332; 156/71, 249, 337

[56] References Cited

U.S. PATENT DOCUMENTS

| | | | |
|---|---|---|---|
| 3,532,586 | 10/1970 | Haurey et al. | 161/113 |
| 3,900,102 | 8/1975 | Hurst | 428/40 |
| 4,022,248 | 5/1977 | Hepner et al. | 138/141 |
| 4,039,706 | 8/1977 | Tajima et al. | 428/40 |
| 4,091,135 | 5/1978 | Tajima et al. | 428/40 |
| 4,157,410 | 5/1979 | McClintock | 428/40 |
| 4,172,830 | 10/1979 | Rosenberg | 428/245 |
| 4,215,160 | 7/1980 | Rosenberg | 427/177 |

OTHER PUBLICATIONS

KMM ™ Koppers Roofing & Waterproofing (1976), Trade Brochure of Koppers Co.
Zonolite ® Roof Deck Insulation—Brochure No. 7.15Ge (1980), W. R. Grace & Co.
CRM ® Self–Adhesive Roof Systems—Brochure No. 7.1Gr (1980), W. R. Grace Co.

*Primary Examiner*—Paul J. Thibodeau
*Attorney, Agent, or Firm*—John J. Wasatonic; William L. Baker

[57] ABSTRACT

Roofs of buildings and the like are waterproofed by applying thereto a plurality of preformed, sheet-like, flexible waterproofing laminates each comprised of (i) a lower sheet support layer (preferably a plastic film or foil) non-removably adhered to (ii) an intermediate layer of waterproofing, self-adhesive, bituminous composition such as rubberized asphalt which in turn is removably adhered to (iii) an upper layer of protective sheet material (e.g. siliconized paper). The surface of the lower sheet support (i) remote from the bituminous layer (ii) is non-adherent and the laminate is applied to the roof with such non-adherent surface adjacent the roof. The uppermost protective sheet layer (iii) is subsequently removed exposing the self-adhesive bituminous layer to which is thereafter applied a weathering layer (e.g. a coating of gravel). The non-adherent surface nature of the lower sheet support layer allows any moisture entrapped below the applied waterproofing laminate to move and be distributed or vented. The self-adhesive bituminous layer shields the underlying sheet support (i) from weather and sun, and functions both as a waterproofing layer and as an adhesive layer for the finally-applied weathering layer. The inventive waterproofing method is ideally suited for use over roof decks which contain hydratable thermoinsulating concrete layers.

27 Claims, 2 Drawing Figures

METHOD OF WATERPROOFING ROOFS AND THE LIKE

BACKGROUND OF THE INVENTION

The invention is directed to a method of waterproofing roofs and the like. In particular, the invention concerns a waterproofing method wherein a continuous impervious membrane is formed upon roofs and the like, the membrane being spaced from the roof to permit movement of moisture and further being constructed using factory-prepared, flexible sheet-like laminates of the type having a self-adhesive bituminous waterproofing layer supported by and adhered to a sheet support therefor, such as plastic film or foil.

Roofs and like building surfaces exposed to the weather must in some fashion be provided with a continuous layer impermeable to water, a so-called "waterproofing membrane". For many years (and still today) the most common "membrane" is comprised of several plies of asphalt-impregnated felts bonded together with hot or cold-applied asphalt, tar, etc., adhesive. The bonding of the several plies together is usually accomplished in situ upon the roof, hence the terminology "built-up waterproofing membrane".

Flexible sheet-like laminates of (a) support films and (b) self-adhesive bituminous waterproofing layers preformed in the factory have been successfully employed in roofing and other waterproofing applications as substitutes for the aforedescribed "built-up" waterproofing membranes which are constructed at the job site by plying together one or more layers of bitumen-saturated paper or felt and usually hot bituminous adhesives. The pre-formed, self-adhesive laminate-membranes offer many advantages including factory controlled preparation, avoidance of heating equipment and handling of hot materials at the job site, as well as many performance advantages.

Flexible pre-formed laminates of the aforementioned type and their use to form waterproofing layers in various kinds of building structures are described for example in U.S. Pat. Nos. 3,741,856; 3,853,682; and 3,900,102 to John Hurst. Such patents describe in particular the preparation of flexible laminates containing a support material, for example a layer of a polymeric or metallic film non-removably joined to a layer of self-adhesive, or pressure-sensitive adhesive, bitumen-elastomer waterproofing composition. As discussed in particular in U.S. Pat. No. 3,900,102, such laminates may ideally be constructed in the plant in the form of a roll with a protective sheet, for example a sheet of siliconized paper applied against the self-adhesive bituminous waterproofing layer, transported to the job site, and thereafter applied to a substrate bituminous adhesive side down, each successive laminate strip being made to overlap the edge of the previously-applied strip of laminate to insure a continuous waterproofing seal.

Commercial products produced utilizing the basic technology of these patents and designed particularly for roofs are described in brochure 7.1/Gr. entitled "CRM® Self-Adhesive Roof Systems", published by W. R. Grace & Co., 1980. As described in such brochure, the exposed surface of the support sheet of the applied membrane is given a final smooth surface protective coating or a coating of adhesive to bond subsequently-applied weathering material such as gravel.

In certain roofing applications, it is necessary or desirable that the waterproofing membrane layer not be adhered over its entire lower surface to the roof substrate or deck as in the case of the aforementioned patents and brochure. For example, many roofing systems incorporate as the, or as part of the, thermoinsulation in the roof, one or more layers of lightweight cementitious thermoinsulating concretes. Such concretes typically comprise mixtures of essentially a hydratable cementitious binder such as Portland cement or gypsum, and lightweight low-density aggregate. Chemical additives such as surfactants may further be present to entrain air, etc. The concretes are usually prepared at the job-site by mixing water with the dry ingredients, pumping the wet mix to the rooftop, casting the wet concretes upon the roof and thereafter allowing the concrete to hydrate or dry. Moisture remaining in such concrete layers after installation of the waterproofing membrane thereover can become a problem on hot days in that the heat could cause blistering within the membrane. To avoid this, the waterproofing membrane is spaced from the roof deck which allows room for movement of moisture beneath the membrane. To provide the necessary bonding of the membrane to the roof and increase its resistance to being "uplifted" by wind, the membrane is "spot-bonded", e.g., adhered to the deck by spaced-apart roofing nails which leave sufficient space beneath the membrane for moisture movement.

In adapting the self-adhesive waterproofing membrane laminates of the type shown in the aforementioned Hurst patents and "CRM" product brochure to roofing systems requiring spacing between the membrane and the roofdeck, a separator sheet is necessary to negate the adhesion between the self-adhesive bituminous layer and the roofdeck. Also, to hold the "weathering" layer of gravel finally applied to the surface of the membranes, a coating of gravel adhesive must first be applied (c.f. page 305 of the aforementioned "CRM" product brochure). The gravel, inter alia, protects the upper plastic film support from ultraviolet radiation. The use of such separator sheets and application of such gravel adhesive after installation of the membrane laminates however lead to increased costs of labor and material and also slow the installation rate of the waterproofing membrane system.

Pre-manufactured waterproofing membranes comprised of polymer film layers and bituminous waterproofing layers have been applied in the past to roofs, etc., in a manner such that the membrane is not adhered over its entirety to the roof. For example, a pre-manufactured membrane laminate termed "KMM" and described in a product brochure entitled "KMM Koppers Roofing and Waterproofing Membrane", published by Koppers Company, Inc., 1976, is applied in such a "floating" or "loose-laid" fashion. The "KMM" product is a non-self adhesive, multi-layer laminate comprised of several layers of plastic film and bitumen composition which is laid upon the roofdeck and abutting edges of like laminates are heated to "weld" the laminates into a continuous waterproofing layer. Also, in U.S. Pat. No. 4,039,706 to Tajima (1977), self-adhesive strip-laminates comprised of a sheet support and self-adhesive bituminous layers are said in one embodiment (column 11) to be applicable to roofs, etc., adhesive-side up. Another like laminate is then applied adhesive-side down to the upper exposed layer of adhesive of the first applied laminate resulting in a continuous waterproofing membrane layer composed over its entirety of "multi-layers" of bituminous adhesive and sheet support.

SUMMARY OF THE INVENTION

It was found that the self-adhesive waterproofing membrane laminates of the type described in the aforementioned Hurst patents and "CRM" product brochure could ideally be made adaptable for use over roofdecks wherein venting of moisture is desired or required, by essentially inverting such laminates during application to the roofdecks. Thus, instead of removing the protective "release" sheet from the adhesive and applying such laminates adhesive side-down, the protective "release" sheet is left on the laminates and the laminates are placed with the non-adhesive support sheet surface (e.g. polymer film) against the roofdeck. The positioning of the laminate in such "upside-down" manner avoids the necessity of using a separator sheet to negate the adhesion of the bituminous adhesive, and, after removal of the uppermost protective sheet from the adhesive, an adhesive layer is presented which can serve to adhere the customary "weathering" layer of gravel. An added advantage of the method of the invention is that the uppermost protective "release" sheet can be left on for a period of time to "protect" the applied laminate until the waterproofing job is completed and ready for the final application of gravel. Also, the new arrangement according to the invention positions the support sheet of the laminate beneath the layer of bituminous adhesive where it is given added protection against exposure to ultraviolet, weather, etc., by such adhesive layer.

DETAILED DESCRIPTION OF THE INVENTION

Figure 1:
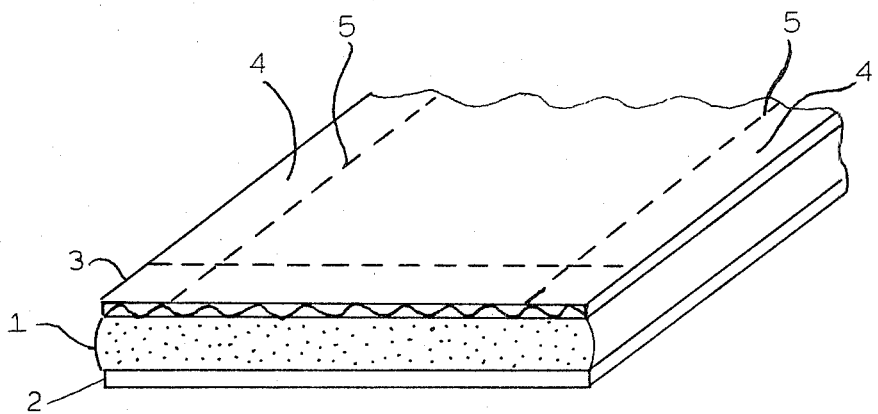
FIG. 1 is a perspective view of a preferred waterproofing laminate construction for use in the method of the invention.

In the attached FIG. 1, a flexible laminate strip is shown as comprised of a comparatively thick layer of normally self-adhesive bituminous water-proofing composition 1, adhered to a comparatively thinner support layer 2, for example, a sheet of polymeric film 1. The layers 1 and 2 are well-bonded to one another, that is, are not separable from one another normally without physical damage resulting to one or both on the layers. The self-adhesive bituminous waterproofing layer 1 will normally have sufficient adhesive properties that additional adhesive to bond it thoroughly to the support layer 2 will not be necessary. To protect the surface of the bituminous adhesive layer remote from layer 2, a removable protective sheet 3, for example a sheet of siliconized paper, is applied thereto. The sheet 3 adheres sufficiently to the bituminous adhesive to keep it in place during rolling up and handling of the laminate, but is easily removable therefrom without physical damage to the layer 1. To render the laminate strip easier to apply according to the method of the invention as hereinafter discussed, the protective sheet 3 has a series of perforations 5 along one or more of its lateral edges. The perforations allow portions 4 of the sheet to be selectively removed during installation of the laminate without removal of the entire protective sheet 3 at the same time. The flexible laminate strip shown in FIG. 1 preferably has a width say of thirty six inches and a length of sixty feet and is conveniently produced in the form of a roll for delivery to the job-site.

The self-adhesive or pressure-sensitive bituminous waterproofing layer 1 useful herein is preferably of the type described in U.S. Pat. Nos. 3,741,856, 3,853,682 and 3,400,102 to John Hurst. The adhesive composition comprises a mixture of (a) a bituminous material and (b) natural or synthetic polymer preferably a rubber or other elastomer polymer. The amount of polymer employed in such compositions is typically from about 1 to 100, preferably about 20 to 50, percent by weight of the bituminous material. The term "bituminous material" as used herein includes compositions containing asphalt, tar such as coal tar, or pitch. The bituminous adhesive may be reinforced with fibers and/or particulate fillers. The adhesive composition may also contain a conventional extender component such as mineral oil. Suitable polymer components include thermoplastic polymers such as polyethylene and the like. As aforementioned, the preferred polymer component is rubber which may be virgin rubber oa a synthetic rubber which is blended into the bitumen and preferably an extender oil component preferably at elevated temperature, to form a smooth mix. Generally, suitable adhesive compositions have softening points (measured by the Ring and Ball method) of 70° to 120° C., preferably 75° to 100° C., and penetration values of 50 to 400, preferably 50 to 100 dmm. at 25° C. (150 g/5-ASTM D217), and are thermoplastic in nature.

As mentioned in the aforementioned Hurst patent, in order to give optimum sealing and waterproofing performance the adhesive layer should be at least 0.010 inch thick and preferably in the range of about 0.025 to about 0.200 inch thick. The adhesion layer can be comprised of one or more layers of the aforementioned bituminous adhesive, not necessarily of the same composition, to give an adhesive layer within the overall aforementioned thickness range. Further, the adhesive layer can have a reinforcement such as an open weave fabric, gauze, scrim or the like located therein to strengthen it. The adhesive layer 1, at least at its surface remote from support sheet 3 is pressure-sensitive and tacky at nornal ambient temperature in order that it be self-adhesive to the substrate. The bituminous adhesive layer serves to form a continuous waterproofing layer which is elastic and self-sealing against punctures at high and low temperature, and also as an adhesive for weathering material applied to the laminate at the job site as hereinafter discussed.

The support layer 2 serves as a strength imparting and supporting member in the laminate and also as a barrier to prevent moisture vapor transmission through the laminate. Thus while of less thickness than that of the bituminous waterproofing layer 1, the support layer 2 should be of sufficient thickness to impart e.g. tear and puncture resistance to the laminate. The support layer 2 suitably has a thickness in the range of from about 0.002 to about 0.025 inches, preferably from about 0.004 to about 0.010 inches.

The preferred sheet materials for use in the layer 2 are films of synthetic organic polymers such as polyethylene, polypropylene or other polyolefin; polyamide, polyester, e.g. polyethylene terephthalate, polyurethane, polyvinyl chloride, a copolymer of vinyl chloride and vinylidene chloride, synthetic rubber such as polychloroprene or butyl rubber, and metal films or foils such as aluminum, copper, zinc, etc.

The polymer films may be uniaxially oriented or cross-laminated polymer films and biaxially-oriented polymeric films. Any film-forming synthetic polymer or copolymer which can be oriented (biaxially or cross-laminated) is useful. Biaxially oriented films of such polymers as polyolefins, e.g. high and low density polyethylene, vinyldiene chloride, polystyrene, polyvinyl chloride, rubber hydrochloride, polyethylene terephthalate, etc., are commercially available. Especially useful films are biaxially oriented polyolefin and cross-laminated polyolefins. Preferred polymeric films for use as or in the support layer 2 are cross-laminated high density polyethylene films and biaxially oriented polyesters such as polyethylene terephthalate. The use of such cross-laminated filmes and biaxially-oriented films in waterproofing laminates is described for example in Canadian Pat. No. 1008738 to Everett R. Davis.

In a particularly preferred embodiment, the adhesive in FIG. 1 comprises a 0.032 inch thick layer of a self-adhesive composition containing essentially asphalt, styrene-butadiene rubber and oil, and the layer 2 comprises a 0.008 inch thick layer of a cross-laminated high density polyethylene film.

As aforementioned, a sheet of paper, e.g. Kraft paper, having a coating thereon of silicon "release" composition as is well known in the art, may be used as the protective layer 3. Other sheet materials, for example clear plastic films, having the requisite "release" properties per se or "release" coatings thereon could also be used.

Figure 2:
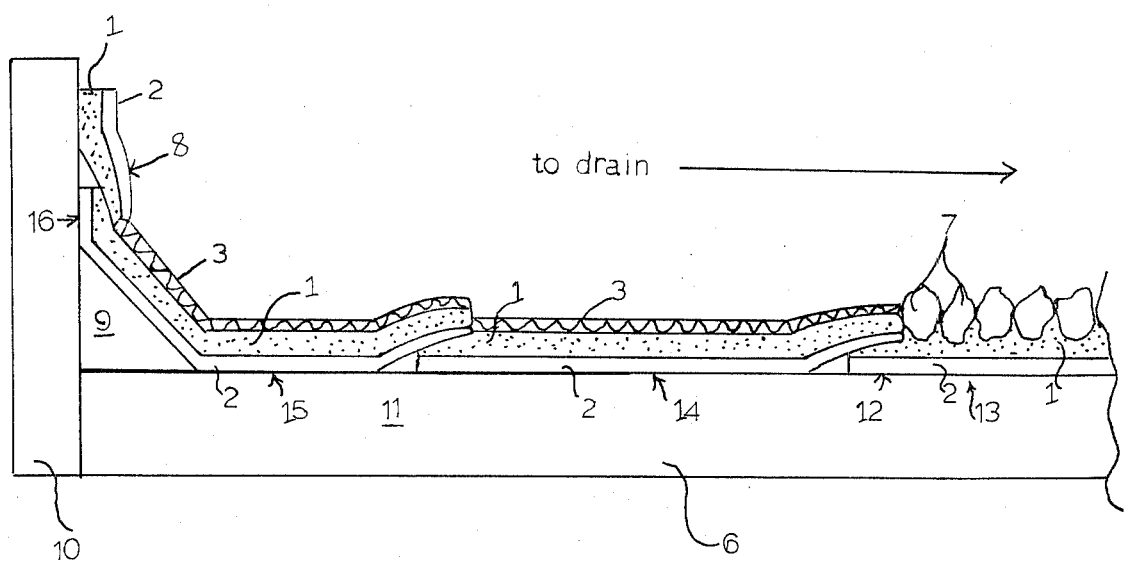
FIG. 2 is a side view illustrating the waterproofing of a section of a roof according to the method of the invention.

In FIG. 2, the laminate strip of FIG. 1 is applied to a roofdeck 6 according to the method of the invention. In FIG. 2, the thickness of the applied laminates is exaggerated for purposes of clarity.

Roofdeck 6 may be, for example, a layer of lightweight insulating concrete, optionally containing a layer of foamed insulation boards, such as insulated roofdeck shown and described in U.S. Pat. No. 4,189,866 to Robert Frohlich et al, and also described in the product brochure 7.15/Ge, ZONOLITE ROOF DECK INSULATION published by W. R. Grace & Co., 1980. The lightweight insulating concretes described therein are prepared at the job site by mixing essentially water, cement and lightweight aggregate such as expanded vermiculite or perlite, and thereafter casting the wet fluid mix upon a structural deck.

The laminate strips of FIG. 1 are unrolled upon the deck 6 as shown, with the non-adhesive support layer 2 nearest the deck. The first laminate, 13 in FIG. 2, is applied nearest the drain so that successively applied laminates 14 and 15 form overlaps in the fashion shown in FIG. 2 in order that water falling upon the finished roof does not flow directly into an overlapped joint.

As shown in FIG. 2, the first applied laminate 13 is overlapped by the next applied laminate 14 at joint 12. Prior to overlapping by laminate 14, the marginal portion 4 of the protective sheet 3 of laminate 13 nearest joint 12 is removed, and roofing nails (not shown) are inserted through the exposed adhesive 1 and layer 2 into the deck 6. The lower face of support sheet 2 of laminate 14 is then placed over the exposed adhesive layer of laminate 13 and nailheads therein, forming overlap joint 12. An identical application procedure is followed for laminates 14 and 15 at overlap joint 11.

The margin of laminate 15 remote from laminate 14 proceeds over cant strip 9 and up the inner face of parapet wall 10. The marginal portion 4 of the protective sheet 3 of laminate 15 is removed at joint 16 and laminate 15 nailed to the wall 10 at joint 16. Another strip 8 of waterproofing laminate is then applied adhesive side-down in overlapping fashion upon the nailed exposed adhesive layer of laminate 15 forming a watertight joint at 16.

As shown in FIG. 2, the exposed removable protective sheets 3 of laminates 14 and 15 are left in place serving as temporary protection until completion of the installation of the laminates upon the roof. Subsequently, each of the sheets 3 are removed and the final weathering layer of, for example, sand or gravel particles 7, are embedded in the exposed adhesive 1, as shown in FIG. 2 in connection with laminate 13.

The result is a single-ply, integral, watertight waterproofing membrane which is anchored to the deck only at spaced intervals by the nails driven at the overlapped joints 11, 12 and 16. Since the laminates are otherwise nonadhered to the roofdeck, room is left between the deck and the membrane for movement or distribution of any moisture vapor building up beneath the membrane. If desired, vents (not shown) could be placed through the membrane to allow for passage of such moisture vapor to the atmosphere.

It is claimed:

1. A method of forming a continuous waterproofing layer upon a substrate, said method comprising, in sequence, the steps of:
   (a) providing a plurality of pre-formed waterproofing laminates, said laminates being comprised, prior to application to said substrate, of (i) a flexible sheet support non-removably adhered to one face of (ii) a normally tacky, self-adherent layer of waterproofing, pressure-sensitive, bituminous adhesive composition having a thickness of at least 0.010 inches, the surface of said sheet support remote from said adhesive being non-adherent, and (iii) a protective sheet covering the face of said adhesive layer (ii) remote from said sheet support (i), said protective sheet being removably adhered to said adhesive layer;
   (b) positioning said laminates in side-by-side fashion upon said substrate with the non-adherent surface of said flexible sheet support (i) of each laminate being adjacent said substrate;
   (c) removing said protective sheets (iii) from said laminates to expose said self-adhesive bituminous layer (ii); and
   (d) covering said exposed adhesive layer with granular weathering material said adhesive serving to adhere said weathering material to the surface of said laminate, whereby a single-ply continuous, water-impermeable waterproofing layer is formed upon said substrate wherein any moisture vapor beneath said waterproofing layer is able to move between said waterproofing layer and said substrate due to the said non-adherent nature of said surface of said support sheet adjacent said substrate.

2. The method of claim 1 wherein said adhesive composition comprises a mixture of a polymer and bitumen.

3. The method of claim 2 wherein said polymer is natural or synthetic rubber and said bitumen is asphalt.

4. The method of claim 3 wherein said adhesive composition additionally contains mineral oil.

5. The method of claim 1 wherein said sheet support (i) has a thickness of from about 0.002 to about 0.025 inches.

6. The method of claim 1 wherein said sheet support is a sheet of polymer film comprised of a polymer selected from the group consisting of polyolefin, polyester, polyurethane, polyvinyl chloride, a copolymer of vinyl chloride and vinylidene chloride, and synthetic rubber.

7. The method of claim 6 wherein said polymer film is comprised of a cross-laminated polymeric film or a biaxially-oriented polymeric film.

8. The method of claim 7 wherein said film is comprised of high density polyolefin.

9. The method of claim 1 wherein said weathering material comprises particles of sand or gravel.

10. The method of claim 1 wherein said laminates are placed in overlapping fashion upon said substrate.

11. A method according to any of claims 1 to 10 wherein said laminates are in the form of a continuous strip having a width of at least about 36 inches and a length greater than said width.

12. A method of forming a continuous waterproofing layer upon a roofdeck, said method comprising, in sequence, the steps of
 (a) providing a plurality of pre-formed flexible waterproofing laminates, said laminates being comprised, prior to application to said roofdeck, of (i) a flexible sheet support of polymeric film non-removably adhered to one face of (ii) a normally tacky, self-adherent layer of waterproofing, pressure-senstive, bituminous adhesive composition having a thickness of at least 0.010 inches, the surface of said sheet support remote from said adhesive being non-adherent, and (iii) a protective sheet covering the face of said adhesive layer (ii) remote from said sheet support (i), said protective sheet being removably adhered to said adhesive layer;
 (b) positioning said laminates successively and in overlapping fashion upon said roofdeck, said non-adherent surfaces of said sheet supports of said laminates being adjacent said roofdeck;
 (c) removing said protective sheets (iii) from said laminate to expose said self-adhesive bituminous layer (ii); and
 (d) covering said exposed adhesive layer with granular weathering material said adhesive serving to adhere said weathering material to the surface of said laminates, whereby a single-ply, continuous, water-impermeable waterproofing layer is formed upon said roofdeck wherein any moisture vapor beneath said waterproofing layer is ble to move between said waterproofing layer and said roofdeck due to the said non-adherent nature of said surface of said support sheet adjacent said roofdeck.

13. The method of claim 12 wherein said protective sheets (iii) of said laminates is perforated along at least one marginal edge thereof to provide a portion thereof separately-removable from said laminate, and said separately-removable portion is removed prior to said overlapping of the laminate by a successively applied laminate.

14. The method of claim 12 wherein said laminates are mechanically secured to said roofdeck at spaced intervals.

15. The method of claim 12 wherein said roofdeck is comprised of a layer of insulating concrete.

16. A method of forming a single-ply, waterproofing layer upon a substrate, said method comprising, in sequence, the steps of:
 (a) providing first and second pre-formed flexible waterproofing laminates, said laminates being comprised, prior to application to said substrate, of (i) a flexible sheet support non-removably adhered to one face of (ii) a normally tacky, self-adherent layer of waterproofing, pressure-sensitive, bituminous adhesive composition having a thickness of at least 0.010 inches, the surface of said sheet support remote from said adhesive being non-adherent, and (iii) a protective sheet covering the face of said adhesive layer (ii) remote from said sheet support (i), said protective sheet being removably adhered to said adhesive layer;
 (b) positioning said first laminate on said substrate, said non-adherent surface of said sheet support of said first laminate being adjacent said substrate;
 (c) removing a marginal portion of said protective sheet from said first laminate to expose the underlying said self adhesive bituminous layer (ii);
 (d) positioning said second laminate on said substrate in overlapping relation with said first laminate, whereby that portion of said non-adherent surface of said sheet support of said second laminate which does not overlap said first laminate is adjacent said substrate and the overlapping portion of said non-adherent surface of said sheet support of said second laminate contacts said exposed bituminous layer;
 (e) removing the remainder of said protective sheet to expose said self adhesive bituminous layer of said first laminate; and
 (f) covering said exposed adhesive bituminous layer with a weathering material, said adhesive serving to adhere said weathering material to the surface of said laminate;
 whereby a single-ply, water-impermeable waterproofing layer is formed upon said substrate wherein any moisture vapor beneath said waterproofing layer is able to move between said waterproofing layer and said substrate due to the non-adherent nature of said surface of said support sheet adjacent said substrate.

17. A method of claim 16 wherein said substrate is a roofdeck.

18. A method of claim 17 wherein said laminates are mechanically secured to said roofdeck at spaced intervals.

19. A method of claim 18 wherein said roofdeck comprises a layer of insulating concrete.

20. A method of claim 16 wherein said protective sheets of said laminates are perforated along at least one marginal edge thereof to provide a marginal portion thereof separately removable from said laminates.

21. The method of claim 16 wherein said adhesive composition comprises a mixture of a polymer and bitumen.

22. The method of claim 21 wherein said polymer is natural or synthetic rubber and said bitumen is asphalt.

23. The method of claim 22 wherein said adhesive composition additionally contains mineral oil.

24. The method of claim 16 wherein said sheet support (i) has a thickness of from about 0.002 to about 0.025 inches.

25. The method of claim 16 wherein said sheet support is a sheet of polymer film comprised of a polymer selected from the group consisting of polyolefin, polyester, polyurethane, polyvinyl chloride, a copolymer of vinyl chloride and vinylidene chloride, and synthetic rubber.

26. The method of claim 25 wherein said polymer film is comprised of a cross-laminated polymeric film or a biaxially-oriented polymeric film.

27. The method of claim 26 wherein said film is comprised of high density polyolefin.

* * * * *